United States Patent
Yeh et al.

(10) Patent No.: US 10,965,016 B2
(45) Date of Patent: Mar. 30, 2021

(54) ELECTRONIC DEVICE CASING AND ELECTRONIC DEVICE

(71) Applicant: HTC Corporation, Taoyuan (TW)

(72) Inventors: Ying-Hao Yeh, Taoyuan (TW); Sheng-Wen Su, Taoyuan (TW)

(73) Assignee: HTC Corporation, Taoyuan (TW)

( * ) Notice: Subject to any disclaimer, the term of this patent is extended or adjusted under 35 U.S.C. 154(b) by 27 days.

(21) Appl. No.: 16/439,704

(22) Filed: Jun. 13, 2019

(65) Prior Publication Data
US 2020/0028236 A1    Jan. 23, 2020

Related U.S. Application Data

(60) Provisional application No. 62/701,829, filed on Jul. 22, 2018.

(51) Int. Cl.
| | |
|---|---|
| *H01Q 1/42* | (2006.01) |
| *H01Q 1/24* | (2006.01) |
| *H01Q 1/22* | (2006.01) |
| *G06F 1/16* | (2006.01) |

(52) U.S. Cl.
CPC ............... *H01Q 1/42* (2013.01); *H01Q 1/22* (2013.01); *H01Q 1/243* (2013.01); *G06F 1/1698* (2013.01)

(58) Field of Classification Search
CPC ........... H01Q 1/243; H01Q 1/42; H01Q 1/425
See application file for complete search history.

(56) References Cited

U.S. PATENT DOCUMENTS

| | | | |
|---|---|---|---|
| 2009/0130995 A1 | 5/2009 | Wang Chen | |
| 2012/0050975 A1 | 3/2012 | Garelli et al. | |
| 2015/0109167 A1* | 4/2015 | Yarga | H01Q 1/243 |
| | | | 343/700 MS |
| 2016/0192517 A1* | 6/2016 | Tsao | H04M 1/0202 |
| | | | 361/679.01 |
| 2017/0110787 A1* | 4/2017 | Ouyang | H01Q 1/42 |
| 2018/0198196 A1* | 7/2018 | Ely | C23C 28/322 |

FOREIGN PATENT DOCUMENTS

| | | |
|---|---|---|
| CN | 1443341 | 9/2003 |
| CN | 102394342 | 3/2012 |
| CN | 102983391 | 3/2013 |

(Continued)

OTHER PUBLICATIONS

"Office Action of Taiwan Counterpart Application", dated Jan. 8, 2020, p. 1-p. 9.

(Continued)

*Primary Examiner* — Robert Karacsony
(74) *Attorney, Agent, or Firm* — JCIPRNET

(57) ABSTRACT

An electronic device casing adapted to cover an antenna is provided. The electronic device casing includes a supporting layer and a carbon fiber layer. The carbon fiber layer is disposed on a surface of the supporting layer and includes a signal passing region having a plurality of slits and a plurality of microstructures separated by the slits. The signal passing region is adapted to cover the antenna, and a signal excited by the antenna is adapted to pass through the supporting layer and the slits so as to pass through the electronic device casing. An electronic device having the electronic device casing is further provided.

19 Claims, 6 Drawing Sheets

(56) References Cited

FOREIGN PATENT DOCUMENTS

| | | |
|---|---|---|
| CN | 103879064 | 6/2014 |
| CN | 103891042 | 6/2014 |
| CN | 205051997 | 2/2016 |
| CN | 205219901 | 5/2016 |
| CN | 105792560 | 7/2016 |
| JP | 2008230237 | 10/2008 |
| TW | 200923619 | 6/2009 |
| TW | 201415706 | 4/2014 |
| TW | M517970 | 2/2016 |
| TW | M545420 | 7/2017 |

OTHER PUBLICATIONS

"Office Action of China Counterpart Application", dated Jun. 22, 2020, p. 1-p. 9.
"Office Action of China Counterpart Application", dated Jan. 13, 2021, pp. 1-10.

\* cited by examiner

ELECTRONIC DEVICE CASING AND ELECTRONIC DEVICE

CROSS-REFERENCE TO RELATED APPLICATION

This application claims the priority benefit of U.S. provisional application Ser. No. 62/701,829, filed on Jul. 22, 2018. The entirety of the above-mentioned patent application is hereby incorporated by reference herein and made a part of this specification.

TECHNICAL FIELD

The invention relates to an electronic device casing and an electronic device and more particularly, to an electronic device casing and an electronic device that a signal can pass through.

DESCRIPTION OF RELATED ART

At present, consumers' demands for the appearance of electronic devices have been increased, but plastic casings have limited aesthetics and no longer can satisfy user's demands for the appearance. In order to provide the casings of the electronic devices with light, thin, durable and aesthetic effects, one of the options that can satisfy the demands for aesthetics is to make the casings of the electronic devices of a carbon fiber. However, the carbon fiber, due to shielding signals emitted from an antenna, is difficult to be applied to an electronic device with an antenna.

SUMMARY

The invention provides an electronic device casing which is a carbon fiber casing and does not shield antenna signals.

The invention provides an electronic device having the aforementioned electronic device casing.

An electronic device casing of the invention is adapted to cover an antenna. The electronic device casing includes a supporting layer and a carbon fiber layer. The carbon fiber layer is disposed on a surface of the supporting layer and includes a signal passing region. The signal passing region includes a plurality of slits and a plurality of microstructures separated by the slits. The signal passing region is adapted to cover the antenna, and a signal excited by the antenna is adapted to pass through the supporting layer and the slits so as to pass through the electronic device casing.

In an embodiment of the invention, widths of the slits are the same.

In an embodiment of the invention, widths of the slits are between 10 μm and 50 μm.

In an embodiment of the invention, the microstructures include at least one polygonal shape.

In an embodiment of the invention, a part of the slits extend along a first direction, and the other part of the slits extend along a second direction.

In an embodiment of the invention, the first direction is perpendicular to the second direction, such that the at least one polygonal shape is a rectangular shape, and the microstructures are arranged in an array.

In an embodiment of the invention, the at least one polygonal shape is a hexagonal shape, and the microstructures are arranged in a honeycomb shape.

In an embodiment of the invention, the microstructures include a plurality of irregular shapes.

In an embodiment of the invention, the slits include at least one curved slit.

In an embodiment of the invention, the electronic device casing includes at least one insulation filler filling in the slits.

In an embodiment of the invention, side lengths of the microstructures are between 40 μm and 120 μm.

In an embodiment of the invention, the microstructures occupy 70% to 95% of an area in the signal passing region.

In an embodiment of the invention, the supporting layer includes a glass fiber layer, an aramid fiber layer, a silicon carbide fiber layer or a resin layer.

In an embodiment of the invention, a thickness of the supporting layer is greater than or equal to a thickness of the carbon fiber layer.

In an embodiment of the invention, the signal passing region occupies a part of or entire of the carbon fiber layer.

An electronic device of the invention includes the aforementioned electronic device casing and an antenna. The antenna is covered by a signal passing region of the electronic device casing. A signal excited by the antenna is adapted to pass through the supporting layer and the slits so as to pass through the electronic device casing.

In an embodiment of the invention, the antenna is disposed on the other surface of the supporting layer.

In an embodiment of the invention, the antenna is separated from the supporting layer by a distance.

In an embodiment of the invention, an orthographic projection of the entire antenna with respect to the carbon fiber layer is located within a range of the signal passing region.

In an embodiment of the invention, the electronic device comprises a cell phone, a tablet computer, a notebook computer or a virtual reality (VR) simulator.

Based on the above, in the electronic device casing of the invention, the carbon fiber layer is disposed on the supporting layer, and the signal passing region is disposed on a portion of the carbon fiber layer corresponding to the antenna. The signal passing region includes a plurality of slits, the signal excited by the antenna can pass through the slits without being shielded, such that the signal can successfully pass through the electronic device casing. Moreover, because the microstructures of the carbon fiber layer on the signal passing region can be supported by the supporting layer, the electronic device casing can have sufficient structural strength.

To make the above features and advantages of the invention more comprehensible, embodiments accompanied with drawings are described in detail below.

DESCRIPTION OF EMBODIMENTS

Figure 1A:
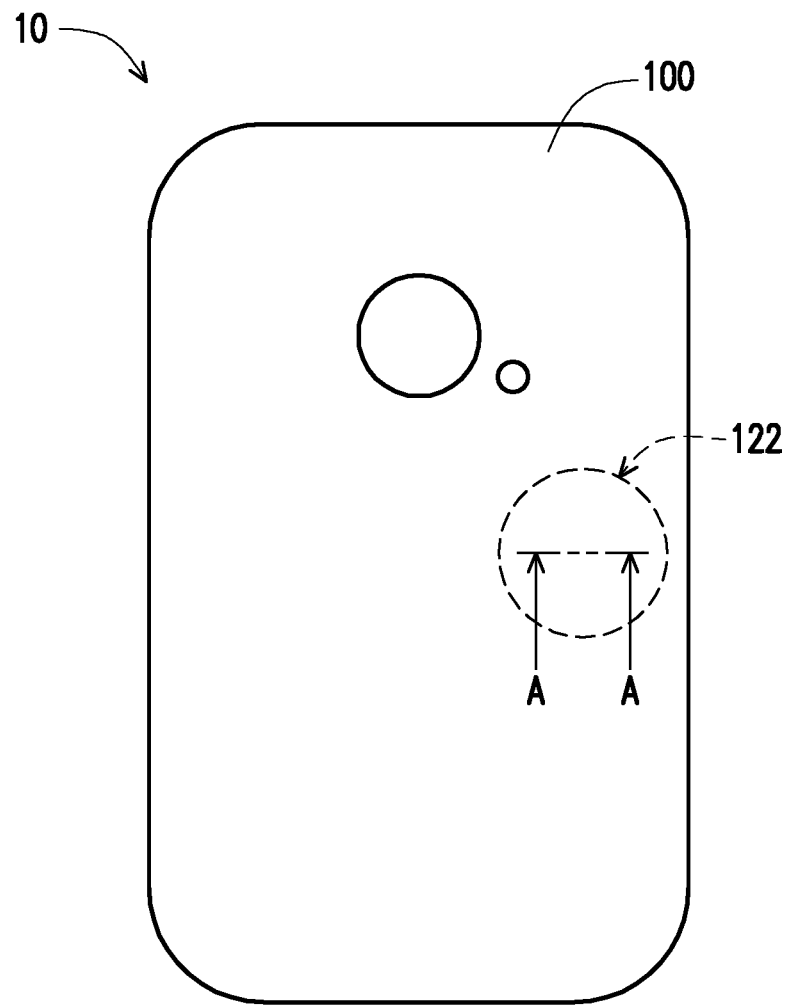
FIG. 1A is a schematic diagram illustrating an electronic device according to an embodiment of the invention.
Figure 1B:
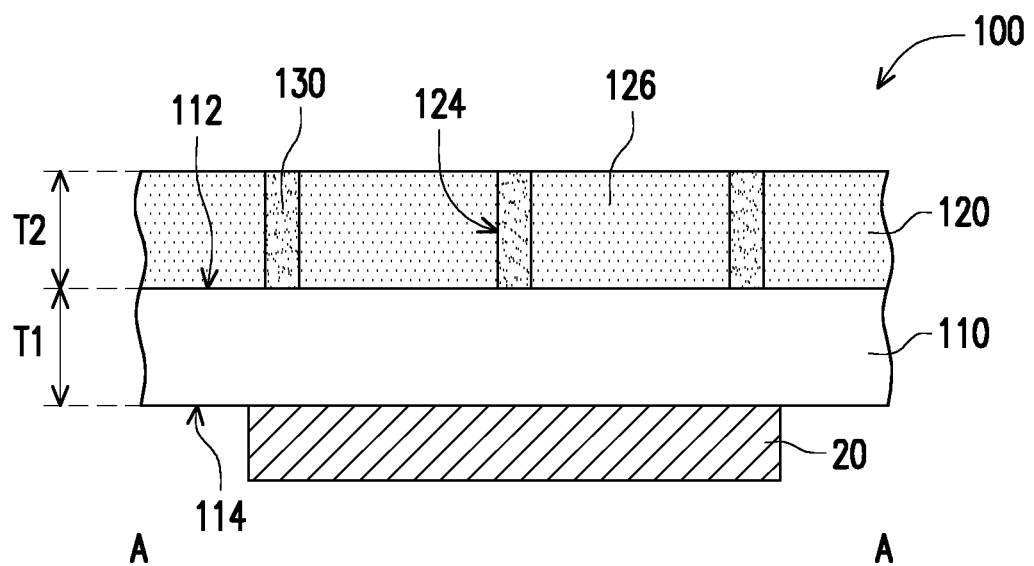
FIG. 1B is a schematic cross-sectional diagram illustrating an electronic device casing of the electronic device depicted in FIG. 1A along line A-A.
Figure 1C:
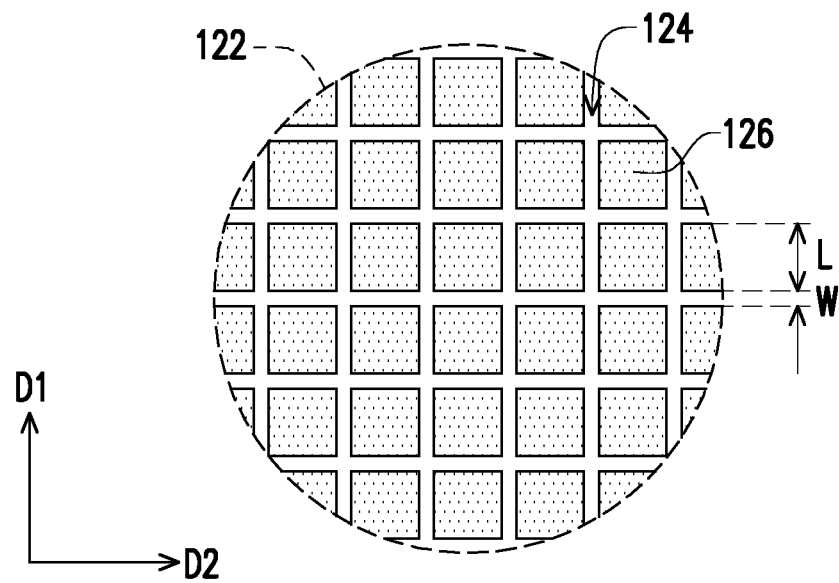
FIG. 1C is a partial schematic diagram illustrating a signal passing region of a carbon fiber layer of the electronic device casing depicted in FIG. 1A.

FIG. 1A is a schematic diagram illustrating an electronic device according to an embodiment of the invention. FIG. 1B is a schematic cross-sectional diagram illustrating an electronic device casing of the electronic device depicted in FIG. 1A along line A-A. FIG. 1C is a partial schematic diagram illustrating a signal passing region of a carbon fiber layer of the electronic device casing depicted in FIG. 1A.

Referring to FIG. 1A to FIG. 1C, an electronic device 10 of the present embodiment includes an electronic device casing 100 and an antenna 20 (with reference to FIG. 1B). The electronic device casing 100 is adapted to cover the antenna 20. In the present embodiment, the electronic device 10 is a cell phone, for example, and the electronic device casing 100 is, for example, a back cover of the cell phone. However, types of the electronic device 10 and the electronic device casing 100 are not limited thereto, any electronic device 10 with the antenna inside is applicable, and the electronic device casing 100 may also be any part of the casing and should not be limited to the back cover.

As illustrated in FIG. 1B, in the present embodiment, the electronic device casing 100 includes a supporting layer 110 and a carbon fiber layer 120. The carbon fiber layer 120 is disposed on a surface 112 (e.g., an outer surface) of the supporting layer 110. The carbon fiber layer 120 is disposed on the supporting layer 110 by means of, for example, adhering, but the manner of disposing the carbon fiber layer 120 on the supporting layer 110 is not limited thereto.

Referring to FIG. 1B and FIG. 1C, in the present embodiment, the carbon fiber layer 120 includes a signal passing region 122. The signal passing region 122 includes a plurality of slits 124 and a plurality of microstructures 126 separated by the slits 124. In the present embodiment, the slits 124 penetrate through the carbon fiber layer 120. The slits 124 are manufactured by means of, for example, etching or laser engraving, but the method of forming the slits 124 is not limited thereto.

In general, the carbon fiber layer 120 shields electromagnetic waves, and it may be difficult for an antenna signal to pass through if the electronic device casing 100 selects to use the carbon fiber layer 120, which results in a condition of poor signal reception. In the present embodiment, the slits 124 of the carbon fiber layer 120 in the signal passing region 122 may allow the antenna signal to pass through, without shielding the antenna signal. That is to say, a signal excited by the antenna 20 may pass through the supporting layer 110 and the slits 124 so as to pass through the electronic device casing 100. In the same way, a signal from the outside may also pass through the supporting layer 110 and the slits 124 so as to be received by the antenna 20. The signal in this case generally refer to a wireless signal, a radio-frequency signal and so on.

Moreover, in the present embodiment, widths W of the slits 124 are the same to improve a passage efficiency of the antenna signal. Certainly, in other embodiments, the widths of the slits 124 may also not be the same. For example, the width of the same slit 124 may be different in different sections, or different slits 124 may have different widths. The width relation of the slits 124 is not limited to the illustration.

It should be mentioned that in the present embodiment, because the carbon fiber layer 120 is disposed on the supporting layer 110, and the microstructures 126 of the carbon fiber layer 120 on the signal passing region 122 may be preferably supported by the supporting layer 110, such that the carbon fiber layer 120 may be prevented from being disintegrated due to the signal passing region 122 which are microscopically a plurality of separated microstructures 126.

In the present embodiment, the supporting layer 110 is, for example, a glass fiber layer, an aramid fiber layer, a silicon carbide fiber layer or a resin layer. Certainly, the invention is not limited thereto as long as the supporting layer 110 may be made by using a material for the antenna signal to pass through and capable of being preferably adhered to the carbon fiber layer 120.

In addition, in the present embodiment, a thickness T1 of the supporting layer 110 is greater than or equal to a thickness T2 of the carbon fiber layer 120, such that the supporting layer 110 may provide preferable support to the carbon fiber layer 120. It should be mentioned that the thicknesses of the supporting layer 110 and the carbon fiber layer 120 illustrated in FIG. 1B are only schematically illustrated, and a ratio thereof is not limited thereto. Moreover, in an embodiment, the thickness T2 of the carbon fiber layer 120 is approximately between 0.03 mm and 0.08 mm, for example, 0.05 mm. Certainly, in other embodiments, the thickness T2 of the carbon fiber layer 120 and the relation between the thicknesses T1 and T2 are not limited thereto.

In addition, in the present embodiment, the electronic device casing 100 includes at least one insulation filler 130 filling in the slits 124, such that dust may be prevented from falling into the slits 124, and the structure strength of the carbon fiber layer 120 may be improved. A material of the supporting layer 130 may be selected from a glass fiber layer, an aramid fiber layer, a silicon carbide fiber layer or a resin layer, which does not shield the antenna signal and allows the antenna signal to pass through, but the material of the insulation filler 130 is not limited thereto. In the present embodiment, surfaces of the insulation filler 130 and the microstructures 126 are co-planar, but the insulation filler 130 may also be slightly lower or slightly higher than the surface of the microstructures 126, which is not limited in the invention. Certainly, in other embodiments, the carbon fiber layer 120 may also not have the insulation filler 130 and expose the slits 124.

As illustrated in FIG. 1B, in the present embodiment, the signal passing region 122 is disposed at a side of (e.g., above) the antenna 20 so as to cover the antenna 20. The antenna 120 may be disposed, for example, on the other surface 114 (e.g., an inner surface) of the supporting layer 110. Certainly, in other embodiments, the antenna 20 may also not be disposed on the electronic device casing 100, but the antenna 20 may be disposed on a substrate (not shown) under the supporting layer 110 and separated from the supporting layer 110 by a distance. A relative distance between and positions of the antenna and the electronic device casing 100 are not limited to the above.

In addition, in the present embodiment, the signal passing region 122 occupies only a part of the carbon fiber layer 120, and an orthographic projection of the antenna 20 with respect to the carbon fiber layer 120 is located within a range of the signal passing region 122. Certainly, in other embodiments, the carbon fiber layer 120 may also be entirely the signal passing region 122 in favor for a designer to design the type of the antenna 20 or dispose a plurality of antennas 20.

Referring to FIG. 1C, in the present embodiment, the widths W of the slits 124 are, for example, between 10 μm and 50 μm. To be more specific, the widths W of the slits 124 are, for example, between 10 μm and 20 μm. Certainly, the widths W of the slits 124 are not limited to the above. Through actual test, the electronic device 10 of the present embodiment may be operated on a 3G, 4G or 5G frequency band signal antenna. Certainly, the type and the frequency band of the antenna applicable to the electronic device 100 are not limited thereto.

It is to be mentioned that because the slits 124 are very narrow, human eyes, when viewing an outer surface of the electronic device casing 100, cannot recognize the difference among the slits 124 of the signal passing region 122, the insulation filler 130 and the microstructures 126, such that the appearance completeness of the carbon fiber layer 120 on the signal passing region 122 may still be maintained. That is to say, by being viewed by the human eyes, the outer surface of the electronic device casing 100 may look like an entirely complete carbon fiber layer 100. In this way, the outer surface of the carbon fiber layer 120 of the electronic device casing 100 no longer needs any additional appearance treatment, such as coating, sputtering or the like, such that processes and cost may be saved.

In the present embodiment, for a portion of the electronic device casing 100 on the signal passing region 122 to macroscopically present completeness without exposing the slits 124 and/or the insulation filler 130, the microstructures 126 occupy, for example, 70% to 95% of an area in the signal passing region 122. In an embodiment, the microstructures 126 occupy, for example, 84% to 92.2% of the area in the signal passing region 122. Certainly, in other embodiments, if the designer wants to design a shape recognizable for the human eyes on the carbon fiber layer 120, the widths W of the slits 124 may be adjusted depending on a demand and are not limited to the above.

It should be mentioned that the microstructures 126 include, for example, at least one polygonal shape. In the present embodiment, a part of the slits 124 extend along a first direction D1, and the other part of the slits 124 extend along a second direction D2. The first direction D1 is perpendicular to the second direction D2, such that the microstructures 126 are rectangular shapes and arranged in an array.

To be more specific, in the present embodiment, the microstructures 126 are square shapes arranged in an array. Side lengths L of the microstructures 126 are between 40 μm and 120 μm. Certainly, the extension manner of the slits 124, and the shape and the size of the microstructures 126 are not limited thereto. In other embodiments, the first direction D1 may also not be perpendicular to the second direction D2, such that the microstructures 126 present rhombus shapes.

Figure 2A:
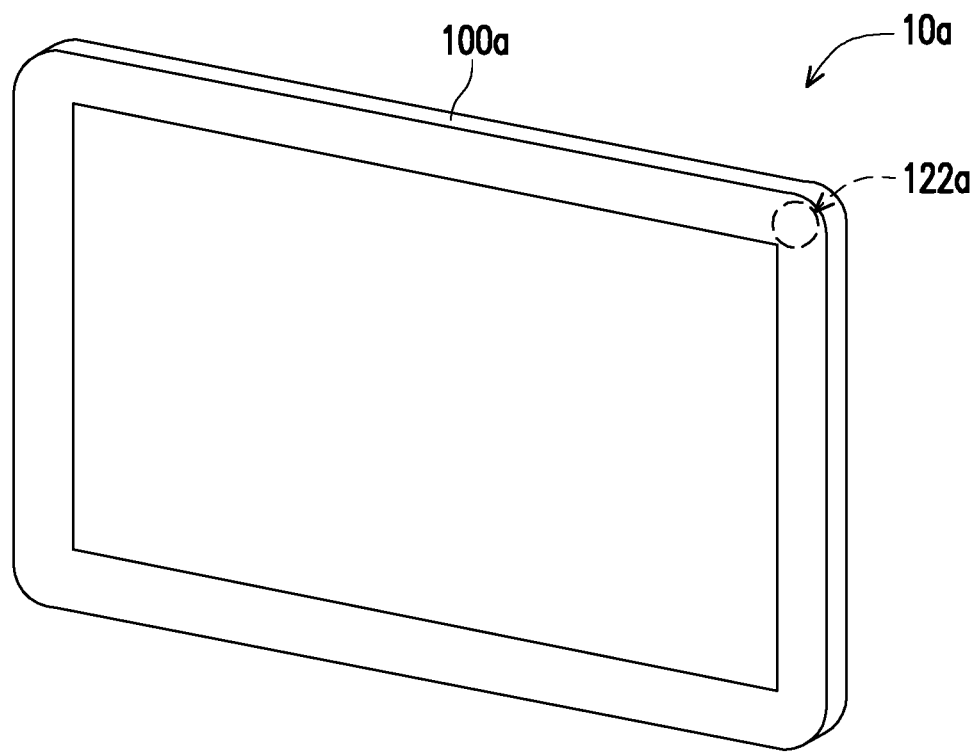
FIG. 2A is a schematic diagram illustrating an electronic device according to another embodiment of the invention.
Figure 2B:
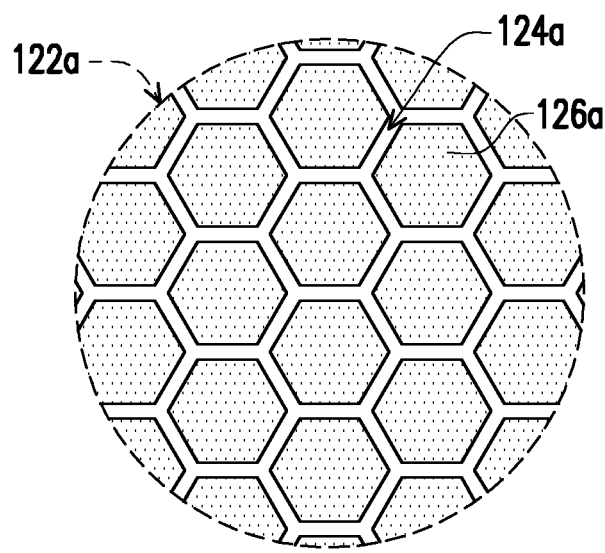
FIG. 2B is a partial schematic diagram illustrating a signal passing region of a carbon fiber layer of the electronic device casing depicted in FIG. 2A.

FIG. 2A is a schematic diagram illustrating an electronic device according to another embodiment of the invention. FIG. 2B is a partial schematic diagram illustrating a signal passing region of a carbon fiber layer of the electronic device casing depicted in FIG. 2A. Referring to FIG. 2A and FIG. 2B, in the present embodiment, an electronic device 10*a* is a tablet computer, for example, and an electronic device casing 100*a* is, for example, a casing of the tablet computer.

As illustrated in FIG. 2B, in a signal passing region 122*a* of the present embodiment, each microstructure 126*a* is a hexagonal shape, and the microstructures 126*a* are arranged in a honeycomb shape. Likewise, slits 124*a* in the signal passing region 122*a* may allow the antenna signal to pass through, without shielding the antenna signal, and widths of the slits 124*a* are the same to improve the passage efficiency of the antenna signal.

Figure 3A:
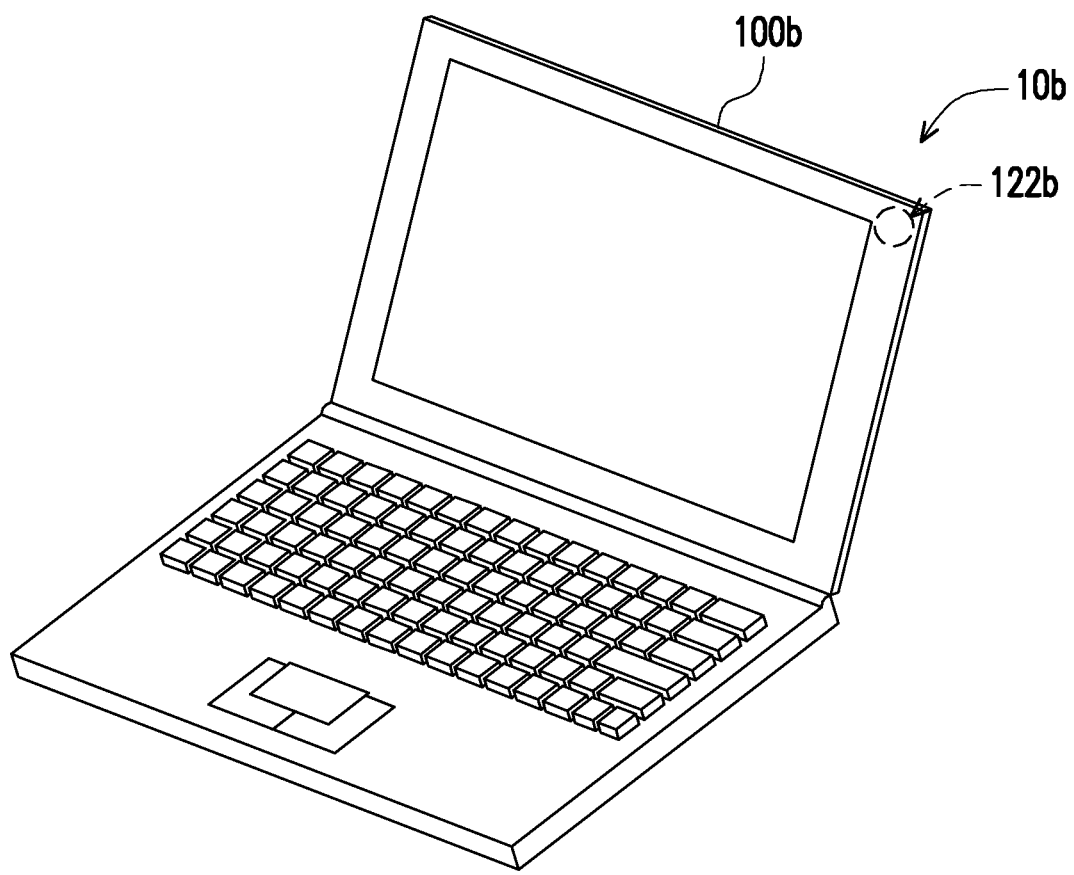
FIG. 3A is a schematic diagram illustrating an electronic device according to yet another embodiment of the invention.
Figure 3B:
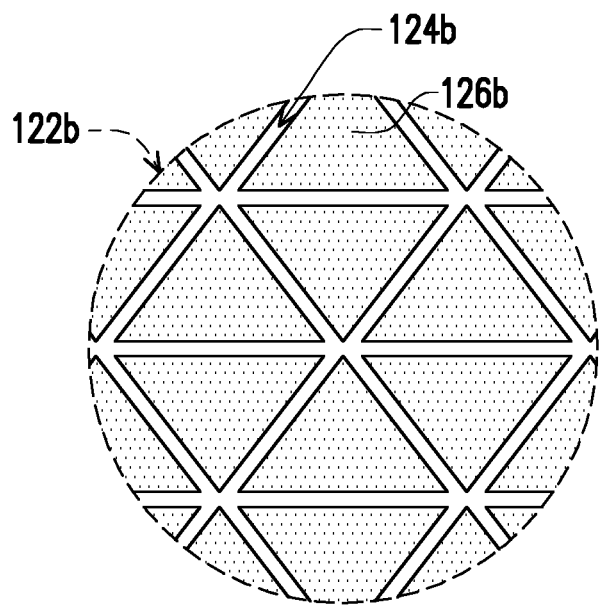
FIG. 3B is a partial schematic diagram illustrating a signal passing region of a carbon fiber layer of the electronic device casing depicted in FIG. 3A.

FIG. 3A is a schematic diagram illustrating an electronic device according to yet another embodiment of the invention. FIG. 3B is a partial schematic diagram illustrating a signal passing region of a carbon fiber layer of the electronic device casing depicted in FIG. 3A. Referring to FIG. 3A and FIG. 3B, in the present embodiment, an electronic device 10*b* is a notebook computer, for example, and an electronic device casing 100*b* is, for example, a casing of the notebook computer. Referring to FIG. 3B, in a signal passing region 122*b* of the present embodiment, each microstructure 126*b* is a triangular shape, and the microstructures 126*b* are equidistantly arranged. Likewise, slits 124*b* in the signal passing region 122*a* may allow the antenna signal to pass through, without shielding the antenna signal, and widths of the slits 124*b* are the same to improve the passage efficiency of the antenna signal.

Figure 4A:
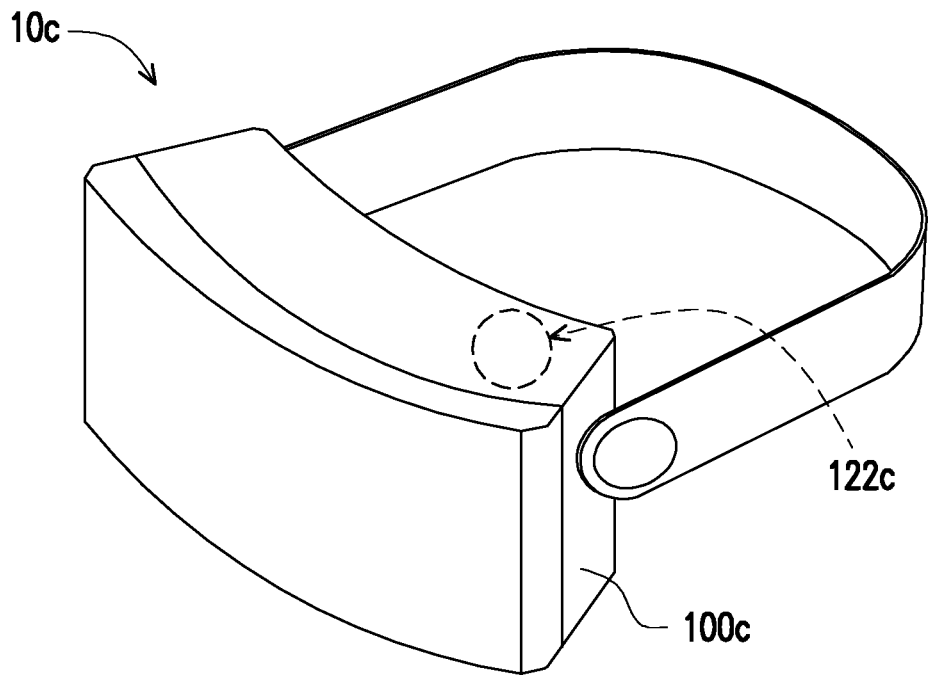
FIG. 4A is a schematic diagram illustrating an electronic device according to still another embodiment of the invention.
Figure 4B:
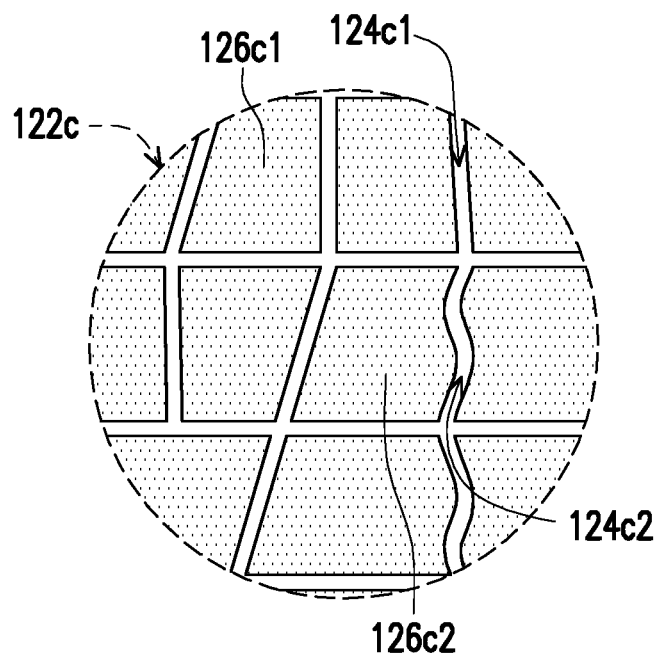
FIG. 4B is a partial schematic diagram illustrating a signal passing region of a carbon fiber layer of the electronic device casing depicted in FIG. 4A.

FIG. 4A is a schematic diagram illustrating an electronic device according to still another embodiment of the invention. FIG. 4B is a partial schematic diagram illustrating a signal passing region of a carbon fiber layer of the electronic device casing depicted in FIG. 4A. Referring to FIG. 4A and FIG. 4B, in the present embodiment, an electronic device 10*c* is a virtual reality (VR) head-mounted display, for example, and an electronic device casing 100*c* is, for example, a casing of the VR head-mounted display. As illustrated in FIG. 4B, in a signal passing region 122*c* of the present embodiment, microstructures 126*c*1 and 126*c*2 have a plurality of shapes. For example, the microstructures 126*c*1 and 126*c*2 include the microstructures 126*c*1 presenting polygonal shapes (e.g., trapezoidal shapes) and the microstructures 126*c*2 presenting irregular shapes, but the shapes of the microstructures 126*c*1 and 126*c*2 are not limited thereto.

In addition, in the present embodiment, slits 124*c*1 and 124*c*2 include the slits 124*c*1 extending along a straight line direction and the slits 124*c*2 which are curved shaped. Likewise, the slits 124*c*1 and 124*c*2 in the signal passing region 122*c* may allow the antenna signal to pass through, without shielding the antenna signal, and widths of the slits 124*c*1 and 124*c*2 are the same to improve the passage efficiency of the antenna signal. In the same way, the signal passing region 122*c* may be designed on any position of the head-mounted display casing.

Figure 5A:
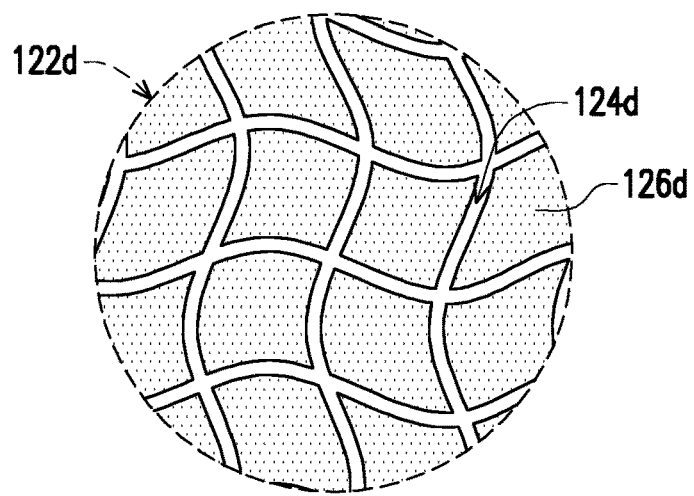
FIG. 5A to FIG. 5C are partial schematic diagrams illustrating signal passing regions according to other embodiments of the invention.
Figure 5B:
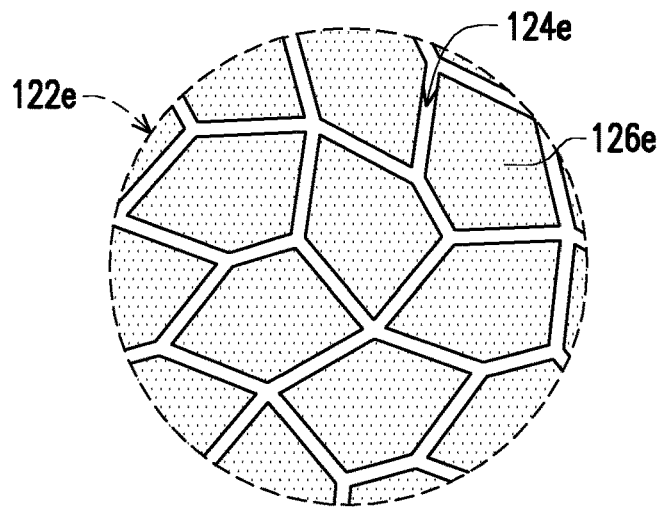
Figure 5C:
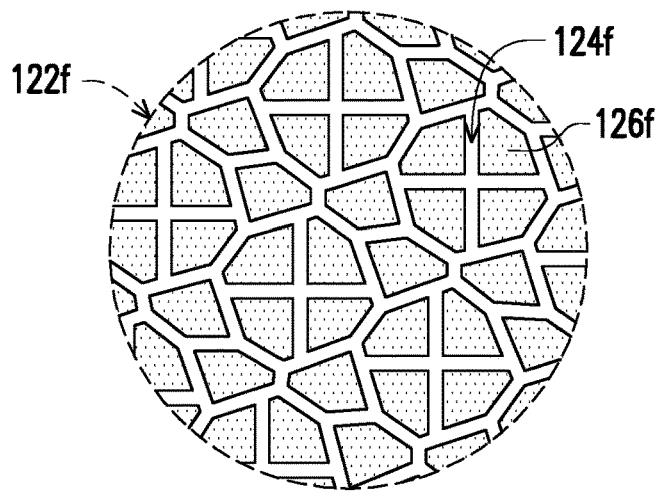

FIG. 5A to FIG. 5C are partial schematic diagrams illustrating signal passing regions according to other embodiments of the invention. Referring to FIG. 5A first, in a signal passing region 122*d* of the present embodiment, slits 124*d* are all curved slits 124*d*, and shapes of microstructures 126*d* are all irregular shapes.

Referring to FIG. 5B and FIG. 5C, shapes of microstructures 126*e* and 126*f* in a signal passing region 122*e* are pentagonal shapes. Likewise, the slits 124*d*, 124*e* and 124*f* in the signal passing regions 122*d*, 122*e* and 122*f* may allow the antenna signal to pass through, without shielding the antenna signal. In addition, widths of the slits 124*d* illustrated in FIG. 5A are the same, widths of the slits 124*e* illustrated in FIG. 5B are the same, and widths of the slits 124*f* illustrated in FIG. 5C are the same, such that the passage efficiency of the antenna signal may be improved.

Based on the above, in the electronic device casing of the invention, the carbon fiber layer is disposed on the supporting layer, and the signal passing region is disposed in a portion on the carbon fiber layer corresponding to the antenna. The signal passing region includes a plurality of slits, the signal excited by the antenna can pass through the slits without being shielded, such that the signal can successfully pass through the electronic device casing. In addition, the electronic device casing can have a sufficient structural strength.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic device casing, adapted to cover an antenna, comprising:
 a supporting layer;
 a carbon fiber layer, disposed on a surface of the supporting layer, and comprising a signal passing region, wherein the signal passing region comprises a plurality of slits and a plurality of microstructures separated by the slits, the signal passing region is adapted to cover the antenna, and a signal excited by the antenna is adapted to pass through the supporting layer and the slits so as to pass through the electronic device casing; and
 at least one insulation filler, filling in the slits, wherein surfaces of the insulation filler and the microstructures are co-planar.

2. The electronic device casing according to claim 1, wherein widths of the slits are the same.

3. The electronic device casing according to claim 1, wherein widths of the slits are between 10 µm and 50 µm.

4. The electronic device casing according to claim 1, wherein the microstructures comprise at least one polygonal shape.

5. The electronic device casing according to claim 4, wherein a part of the slits extend along a first direction, and the other part of the slits extend along a second direction.

6. The electronic device casing according to claim 5, wherein the first direction is perpendicular to the second direction, such that the at least one polygonal shape is a rectangular shape, and the microstructures are arranged in an array.

7. The electronic device casing according to claim 4, wherein the at least one polygonal shape is a hexagonal shape, and the microstructures are arranged in a honeycomb shape.

8. The electronic device casing according to claim 1, wherein the microstructures comprise a plurality of irregular shapes.

9. The electronic device casing according to claim 1, wherein the slits comprise at least one curved slit.

10. The electronic device casing according to claim 1, wherein side lengths of the microstructures are between 40 µm and 120 µm.

11. The electronic device casing according to claim 1, wherein the microstructures occupy 70% to 95% of an area in the signal passing region.

12. The electronic device casing according to claim 1, wherein the supporting layer comprises a glass fiber layer, an aramid fiber layer, a silicon carbide fiber layer or a resin layer.

13. The electronic device casing according to claim 1, wherein a thickness of the supporting layer is greater than or equal to a thickness of the carbon fiber layer.

14. The electronic device casing according to claim 1, wherein the signal passing region occupies a part of or entire of the carbon fiber layer.

15. An electronic device, comprising:
 an electronic device casing, comprising:
  a supporting layer;
  a carbon fiber layer, disposed on a surface of the supporting layer, and comprising a signal passing region, wherein the signal passing region comprises a plurality of slits and a plurality of microstructures separated by the slits; and
  at least one insulation filler, filling in the slits, wherein surfaces of the insulation filler and the microstructures are co-planar; and
 an antenna, covered by the signal passing region of the electronic device casing, wherein a signal excited by the antenna is adapted to pass through the supporting layer and the slits so as to pass through the electronic device casing.

16. The electronic device according to claim 15, wherein the antenna is disposed on the other surface of the supporting layer.

17. The electronic device according to claim 15, wherein the antenna is separated from the supporting layer by a distance.

18. The electronic device according to claim 15, wherein an orthographic projection of the entire antenna with respect to the carbon fiber layer is located within a range of the signal passing region.

19. The electronic device according to claim 15, wherein the electronic device comprises a cell phone, a tablet computer, a notebook computer or a virtual reality (VR) simulator.

* * * * *